United States Patent [19]

Chauveau

[11] Patent Number: 4,526,244

[45] Date of Patent: Jul. 2, 1985

[54] METHOD FOR CONTINUOUS WEIGHING OF DIVIDED PRODUCTS AND APPARATUS FOR PUTTING METHOD TO USE

[75] Inventor: Jean-Marie Chauveau, Cortaillod, Switzerland

[73] Assignee: Hasler Freres International S.A., Cortaillod, Switzerland

[21] Appl. No.: 592,707

[22] Filed: Mar. 23, 1984

[30] Foreign Application Priority Data

Mar. 24, 1983 [CH] Switzerland .................. 1617/83

[51] Int. Cl.³ ........................................... G01G 11/14
[52] U.S. Cl. .......................................... 177/1; 177/16; 177/25
[58] Field of Search .................. 177/1, 16, 25; 73/1 B

[56] References Cited

U.S. PATENT DOCUMENTS 3,623,559 11/1971 Folkes ........................... 177/16 X
3,960,225 6/1976 Hyer et al. ..................... 177/25 X
3,979,943 9/1976 Foster ........................... 177/1 X Primary Examiner—George H. Miller, Jr.
Attorney, Agent, or Firm—Hayes, Davis & Soloway

[57] ABSTRACT

A method and apparatus for continuous weighing of divided products being transported along a conveyor belt is provided, wherein a unit of linear displacement for the belt of the conveyor is defined, called a unit of belt space, and a variable called a belt space variable is associated with theoretical reference points on said belt. An instantaneous measurement of the weight of the belt and/or of the products transported is obtained by means of at least three weighing stations disposed along the belt, weight data furnished by the weighing stations is stored in memory, and the weight data is compared to determine a mean weight.

11 Claims, 1 Drawing Figure

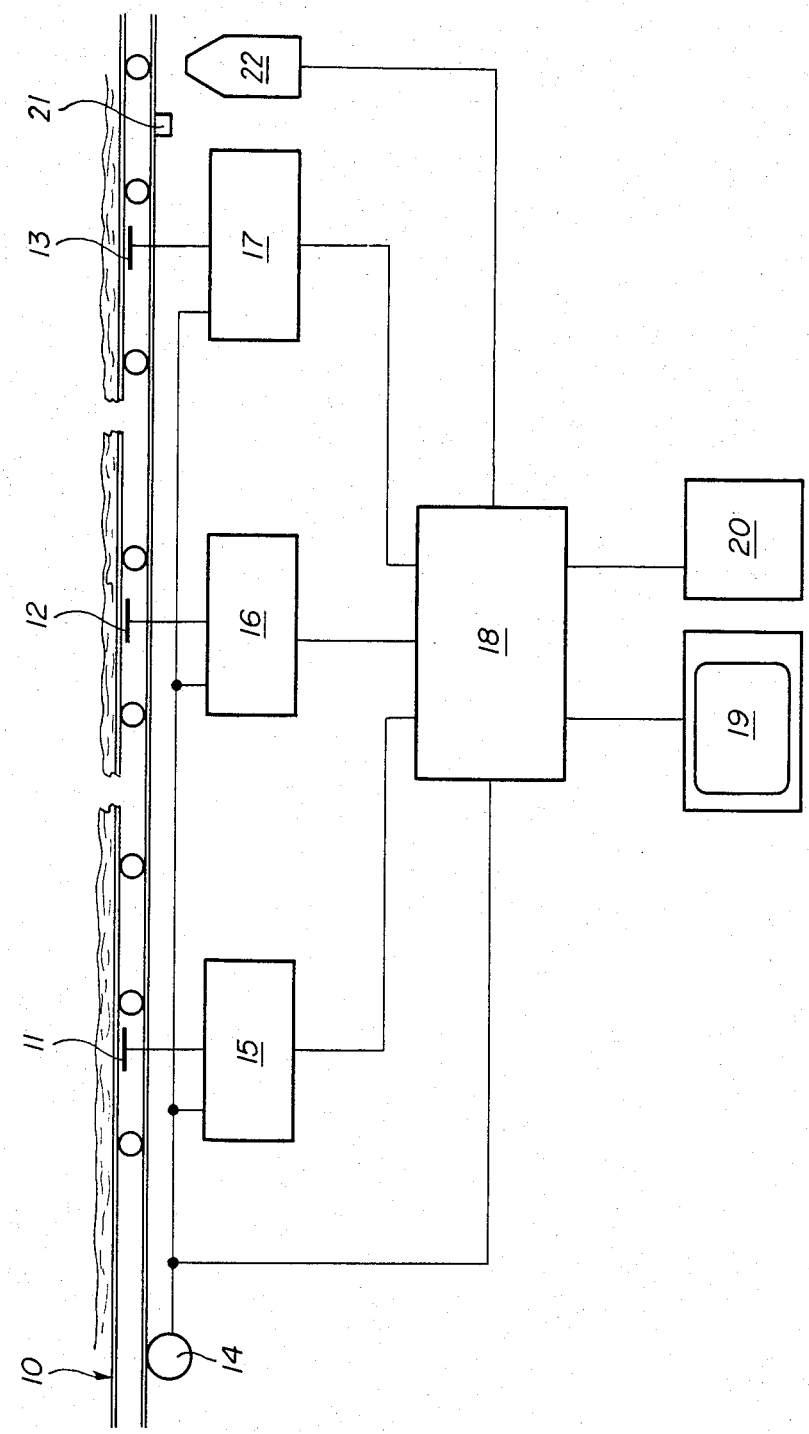

METHOD FOR CONTINUOUS WEIGHING OF DIVIDED PRODUCTS AND APPARATUS FOR PUTTING METHOD TO USE

The present invention concerns a method for continuous weighing of divided products being transported along a conveyor belt.

It further concerns an apparatus for putting this method to use, comprising a conveyor belt and at least one weighing means providing an instantaneous indication of the weight of the belt and/or of the products being moved.

When using conveyor belts, current practice is to use integrating scales to measure and total the quantity of material being transported. These devices generally comprise a measuring area which has one or several stations with supporting cylinders where weight is determined using a weighing mechanism connected to a weight recording means. A tachometric generator, usually coupled with the return cable of the conveyor belt, emits a signal proportionate to the speed of the belt. The weight P of the material on the belt is measured by amplifying the signal provided by the return cable in the proper ratio. The output rate of the material is determined according to the formula:

$$Q = P \times V$$

where P represents weight and V, speed.

A signal proportionate to the output is transmitted to a tension/frequency convertor, which converts its amplitude into a series of impulses having a frequency porportionate to the amplitude. These impulses are summed by calculators which provide a relative indication of the quantity of material transported during a given time interval.

These devices have the major drawback of being relatively imprecise, and the universal desire among operators for increased precision is difficult to attain, due to the necessity of:

strictly controlling the thickness of the conveyor belt, the weight of which, in conjunction with its length, constitutes a disadvantage, and its weight fluctuations causing errors in interpretation;

increasing the length of the measuring area, by using stations with several suspended rollers to provide a larger weighing area, thereby integrating fluctuations in defects and speed;

controlling the tension of the conveyor belt.

Certain of these parameters may be overcome only with difficulty in installations of large dimension, particularly when the conveyor comprises a very long belt comprised of a plurality of juxtaposed segments. Increasing the length of the measuring areas involves increased cost and substantially more complex apparatus.

Further, the lack of control means to provide evidence of smooth functioning of the weighing means has often made users prefer weighing means of the "continuous-discontinuous-continuous" type to solve commercial weighing problems. These apparatus usually comprise a collecting means, into which the belt empties the material through a weighing bin which periodically receives the material temporarily stored in the collecting means, and by a second collecting means which receives the material discharged by the weighing bin to guide it towards a recovery belt. A control device adds the different weights and indicates the quantity of material transported. Unfortunately, these apparatus necessitate heavy and expensive infrastructures and are costly. Moreover, use of a conveyor which elevates the material to the level of a first collecting bin involves considerable energy expenditure.

In German Patent application No. DE-OS-27 34 562 there is described another method for detecting errors in weighing, by using a conveyor belt comprising a relatively long measuring area supported by weight recording means. By means of two speed indicators respectively coupled with the two pulse generators, an electronic device integrates the two output rates which are measured simultaneously, by calculating the sum and the instantaneous difference between the two output values. Thus, there is calculated a mean weight value using the sum of the two values, and therefore it is possible to control the function of the weighing apparatus from the differences in the two output values accumulating during a certain interim. However, this method and this embodiment in no way eliminate weighing errors arising from weight variations in the belt itself. Furthermore, in the case of an excessive cumulative difference between the two values measured, the apparatus triggers an alarm, but it does not indicate which value is incorrect or which apparatus is faulty. In such cases, the operator is usually obliged to stop the conveyor belt. Moreover, because of its considerable length, the measuring area on a traditional conveyor belt readjusts poorly after being stopped.

The present invention proposes to overcome the various disadvantages outlined above by a simple, effective method, and by an advantageous installation requiring no heavy and costly infrastructure, which is adaptable to traditional equipment.

To attain this, the weighing method according to the invention is characterized by defining a unit of linear displacement for the belt of the conveyor, and by associating with a unit of theoretical reference points regularly disposed the length of the belt, a respective space variable corresponding to the entire number of these units counted from the origination point of the belt, and by effecting instantaneous measurement of the weight of the belt and/or of the products transported thereon by means of at least three weighing areas disposed along the belt, and by feeding into a memory the weight data furnished by the weighing stations, and by comparing the weight data obtained at a particular reference point on the belt to a corresponding determinate space variable.

The apparatus for putting this method to use is characterized by comprising a reference means to determine a unit of linear displacement for the belt and to associate with a plurality of theoretical reference points regularly disposed along the belt, a respective space variable corresponding to the total number of these units calculated from the origination point of the belt, at least three means for instantaneously weighing the belt and/or the products being transported, these means being respectively mounted on at least three weigh stations spaced apart along the belt, a memory to store the weight data provided by the weighing means, and a comparator to compare the relative weight data provided by the measuring means for the reference point on the belt corresponding to a particular determinate space variable.

By prior definition of a linear unit of displacement for the belt of the conveyor and an origination point of the belt, one can define a space variable (X) allowing theoretical referencing of any point on the belt. If the belt is divided into theoretical segments, the length of which correspond to a previously defined unit of linear displacement, the result is a series of reference points regularly disposed the length of the belt, with which there are respectively associated space variables corresponding to the total number of units of linear displacement on the belt counted from the origination point of the belt. This concept of space variables enables precise pinpointing of the weight upon the empty belt and of the weight upon the belt when transporting products. The weight measured by a measuring station is a function P (X) of the space variable (X) of the corresponding reference point on the belt. The quantity of material transported is defined as being the weight upon the empty belt between two reference points defined by the corresponding values $(X_1)$ and $(X_2)$ of the space variable. Output is defined as being the quantity of material conveyed per unit of time. The speed V of the belt is very traditionally defined in relation to a fixed reference point of the apparatus, for example in relation to a weighing station, and variable time T is associated therewith.

Providing spatial reference points or defining the space variable is done by means of a device which divides the belt into theoretical segments of equal length, and counts a number N of these segments. If dX is the unit of linear displacement of the belt, the belt space is divided into lengths dX of N theoretical segments. All measures of weight will be effected in relation to their distal placement dX on the belt space. The precision of space measurement depends upon the choice of unit dX and upon the number N of theoretical segments. Spatial precision is equal to:

$$e = dX/N$$

In present use, dX is in the order of 5 cm. and N is in the order of 100.

Direct applications of this concept of providing reference points along the belt space will be understood with reference to the description of an example of an embodiment according to the invention and to the attached drawing, which sole drawing is a schematic view illustrating a preferred form of the working apparatus of the invention comprising three measuring stations.

FIG. 1 is an illustration of an embodiment of the invention.

With reference to the FIGURE, the apparatus comprises a conveyor belt 10 provided with three weighing areas 11, 12, 13, each comprising an integrating scale known in the art. These three weighing areas are spaced apart along the belt and their relative distances are known.

A tachometric generator 14, or any other similar device, provides impulses, the number of which is directly linked to the linear displacement of the conveyor belt. In actuality, to a number N of impulses from the generator there corresponds a unit dX of belt space. A count of the impulses determines the position on the belt, independently of the speed V of the belt. This count also allows referencing of the respective positions of weighing areas 11, 12 and 13. Given that the relative distances are known, the latter may be referenced according to relative value, by the number of units of belt space dX separating them. With each weighing area 11, 12 and 13 there is respectively associated an electronic circuit 15, 16 and 17 which receives impulses from the tachometric generator and which provides, for each multiple N of impulses, an indication of weight corresponding to the weight P (X) of the moving belt which may be transporting product. As mentioned above, the weight value is identified by virtue of the fact that it is associated with a determinate value of the space variable. The value is transmitted to a central processing unit 18 provided with a memory and with a data processor, for example a microprocessor, which first stores in its memory all the weight data provided by the weighing areas and secondly, compares and processes this data as will hereinafter be described in greater detail.

In the example shown, the apparatus comprises three weighing areas 11, 12 and 13 which provide, in stages, three indications of weight $P_1(X_0)$, $P_2(X_0)$, and $P_3(X_0)$ for the same value $(X_0)$ of the space variable. These three values are stored in memory by the central processing unit 18. When the last value $P_3(X_0)$ is introduced, the microprocessor searches the recorded values $P_2(X)$ and $P_1(X)$ for those which correspond to the value $(X_0)$ of the space variable (X), for example by recovering from the table of stored values the number of values corresponding to the distance ndX (multiple of the unit of belt space) separating the third measuring area from the second, and the number of values corresponding to the distance mdX separating the third weighing area from the first.

A comparator therefore tests probability by verifying, for example, the following relationships:

$$2 \times P_1(X_0) = P_2(X_0) + P_3(X_0) \text{ to approximately } \delta\%$$

$$2 \times P_2(X_0) = P_1(X_0) + P_3(X_0) \text{ to approximately } \delta\%$$

$$2 \times P_3(X_0) = P_1(X_0) + P_2(X_0) \text{ to approximately } \delta\%$$

where δ represents the margin of error allowed in determining the weight measured.

If the test of probablity is satisfied, control unit 18 accepts as weight $$P_{mean}(X_0) = \tfrac{1}{3}[P_1(X_0) + P_2(X_0) + P_3(X_0)]$$

and calculates the total with this value. This instantaneous value, corresponding to the point having a space variable with a value of $(X_0)$, and the total, may be displayed on a video display monitor 19, and/or registered by any kind of data recording apparatus, 20, known in the art.

If the test of probability is not satisfied, the control unit searches to determine the irregular value by verifying:

$$P_1(X_0) = P_2(X_0) \text{ to approximately } \delta'\%$$

$$P_1(X_0) = P_3(X_0) \text{ to approximately } \delta'\%$$

$$P_2(X_0) = P_3(X_0) \text{ to approximately } \delta'\% \text{ } (\delta'\%: \text{error allowed})$$

When the comparator has determined which of these values should be rejected, it accepts as probable weight the mean of the two values not rejected. If $P_3(X_0)$ is established as the inacceptable weight, the mean weight corresponds to the following formula:

$$P_{mean}(X_0) = \tfrac{1}{2}[P_1(X_0) + P_2(X_0)]$$

The total is then calculated with this mean value.

This procedure provides for rejection of erroneous measurements, for determining if one of the scales has a systematic malfunction and for triggering an alarm to attract the user's attention. In the case of systematic malfunction of one of the scales, the apparatus may subsequently continue to function in reduced mode by using only two readouts instead of three.

As far as precision is concerned, the theory of error calculation affirms that the square of the variation of the system is equal to the sum of the squares of the variations of the balances, thus:

$$\gamma^2 = \gamma 1^2 + \gamma 2^2 + \gamma 3^2$$

And since variation is inversely proportionate to standard deviation, one may then conclude:

$$S^{-2} = s_1^{-2} + s_2^{-2} + s_3^{-2} = 3s^{-2}$$

where s is the standard deviation of measurement stations of identical construction, whence:

$$S = s/\sqrt{3}$$

Precision of the system is increased by a factor equal to the square root of the number of measuring stations. In the instant case, this factor is equal to $\sqrt{3}$.

By carrying out these operations when the belt is empty and moving and by storing the mean givens in memory, it becomes possible to extrapolate a precise index of signals, listing the mean values of the weights of the empty belt provided by the three weighing stations for each of the theoretical reference points upon the belt. A simple arithmetic operation determines the weight of the material transported, by subtracting the mean weight of the empty belt from the value of the mean weight of the loaded belt for each theoretical reference point upon the belt. To avoid possible deviation at the belt's origination point caused by imprecision of the tachometric generator 14, a warning system 21 is affixed to the belt, so that each passage produces in corresponding detector 22 a signal transmitted to central control unit 18. For example, the warning system may be a steel plate detected by a magnetic detector.

While the apparatus described comprises only three measuring stations, it is conceivable to increase their number and to determine weight by means of data supplied by any number of weighing stations.

I claim:

1. A method for continuous weighing of divided products transported on a conveyor belt, which comprises: defining a unit of linear displacement of the conveyor belt and associating a respective space variable with a plurality of theoretical reference points regularly disposed along the belt, said respective space variable corresponding to a total number of these units counted from the point of origin of the belt, generating weight data corresponding to the instantaneous measurement of the weight of the belt and/or of the products conveyed by at least three weighing stations disposed the length of the belt, and storing the weight data obtained from said weighing stations in a memory, and, obtaining weight indications by comparing the generated data for a particular reference point upon the belt for a corresponding determinate space variable.

2. A method according to claim 1, comprising predefining an acceptable margin of error for the weight data furnished by the weighing stations, taking into account the margin of error tolerated, and separating acceptable weight data from the inacceptable data, taking into account the predefined margin of error, calculating a mean value of acceptable weights, and transmitting the value to a visual display monitor and/or data recording device.

3. A method according to claim 2, comprising maintaining weight data furnished by each of the weighing stations under constant surveillance, and triggering a signal when the weight data furnished by at least one of the weighing stations is repeatedly inacceptable.

4. A method according to claim 2, comprising triggering an alarm and stopping the apparatus when no correlation can be established between the measurements provided by the different weighing stations.

5. A method according to claim 1, comprising determining an instantaneous measurement of the weight of the empty belt, storing in memory the weight of the empty belt at each of the theoretical reference points therealong, and determining the effective weight of the material transported by subtracting, for each reference point along the belt, the determinate weight of the empty belt from the determinate value of the loaded belt.

6. A method according to claim 5, comprising determining for each reference point along the belt a mean weight value for the empty belt by taking at least three respective measurements with the spaced apart weighing stations disposed the length of the belt, storing the values obtained in a memory, comparing the values and taking a mean of the measured values considered acceptable taking into account a predetermined tolerated margin of error.

7. An apparatus for putting to use the method according to claim 1, comprising a conveyor belt and at least one weighing means for providing an instantaneous indication of the weight of the belt and/or of the products transported, said weighing means comprising a referencing means to determine a unit of linear displacement for the belt and to associate, with a plurality of theoretical reference points regularly disposed the length of the belt, a respective space variable corresponding to the entire number of these units counted from the point of origin of the belt, at least three means for instantaneously measuring the weight of the belt and/or of the products transported, said at least three means being respectively mounted on at least three weighing stations disposed the length of the belt, a memory for storing the weight data furnished by the weighing means, and a comparator for making relative comparison of the weight data furnished by the weighing means for a given theoretical reference point upon the belt corresponding to a determined space variable.

8. An apparatus according to claim 7, and further comprising an alarm device to signal lack of correlation between the measurements taken by the different measuring means.

9. Apparatus according to claim 7, and further comprising an alarm device to signal repeated errors in at least on measuring means.

10. An apparatus according to claim 7, wherein the comparator comprises means adapted to (a) compare the relative weight data furnished by the weighing means taking into account a predetermined margin of tolerated error, (b) sort the acceptable weight data from the inacceptable weight data taking into account the margin of error tolerated, (c) calculate a mean acceptable weight, and (d) transmit this calculated mean to a visual and/or recording device.

11. An apparatus according to claim 10, wherein the memory comprises means for storing the weight of the empty belt at each theoretical reference point therealong, and the comparator comprises a device to calculate, for each reference point on the belt, the difference between the mean value of weight measured on the loaded belt and the mean value of weight measured on the empty belt.

* * * * *

UNITED STATES PATENT AND TRADEMARK OFFICE
CERTIFICATE OF CORRECTION

PATENT NO. : 4,526,244

DATED : July 2, 1985

INVENTOR(S) : Jean-Marie CHAUVEAU

It is certified that error appears in the above-identified patent and that said Letters Patent are hereby corrected as shown below:

Column 6, line 63 (Claim 9), the word "on" should be --one--.

Signed and Sealed this

Fifteenth Day of October 1985

[SEAL]

Attest:

Attesting Officer

DONALD J. QUIGG

Commissioner of Patents and Trademarks—Designate